(12) United States Patent
Cui et al.

(10) Patent No.: US 12,389,294 B2
(45) Date of Patent: *Aug. 12, 2025

(54) FRAMEWORK FOR A 6G UBIQUITOUS ACCESS NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Johns Creek, GA (US); Paul Smith, Jr., Heath, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,624

(22) Filed: Mar. 15, 2024

(65) Prior Publication Data

US 2024/0251312 A1 Jul. 25, 2024

Related U.S. Application Data

(63) Continuation of application No. 18/054,999, filed on Nov. 14, 2022, now Pat. No. 12,075,298, which is a
(Continued)

(51) Int. Cl.
*H04W 4/00* (2018.01)
*H04W 36/08* (2009.01)
(Continued)

(52) U.S. Cl.
CPC ........... *H04W 36/12* (2013.01); *H04W 36/08* (2013.01); *H04W 36/30* (2013.01); *H04W 76/15* (2018.02); *H04W 84/06* (2013.01); *H04W 84/042* (2013.01)

(58) Field of Classification Search
None
See application file for complete search history.

(56) References Cited

U.S. PATENT DOCUMENTS

| 954,893 A | 4/1910 | Simpson |
| 5,327,572 A | 7/1994 | Freeburg |

(Continued)

FOREIGN PATENT DOCUMENTS

| EP | 3062451 B1 | 6/2018 |
| GB | 2575034 A | 1/2020 |

(Continued)

OTHER PUBLICATIONS

"Final Office Action received for U.S. Appl. No. 16/218,090", Mar. 31, 2022, 26 pages.

(Continued)

*Primary Examiner* — Abdelillah Elmejjarmi
(74) *Attorney, Agent, or Firm* — Guntin & Gust, PLC; Erik Boyd

(57) ABSTRACT

A framework for a 6th generation (6G) ubiquitous wireless communications network is provided. The framework includes obtaining first information associated with a first condition of a terrestrial radio network from a terrestrial controller that collects the first information from the terrestrial radio networks; determining second information associated with a resource of a satellite network, where a defined application is alternatively executable at the mobile device via any of a group of networks, the group comprising the satellite network and the terrestrial radio networks, and determining whether to re-assign the defined application from the terrestrial radio network to the satellite network based on a result of evaluating at least the first condition.

20 Claims, 11 Drawing Sheets

Related U.S. Application Data continuation of application No. 16/218,090, filed on Dec. 12, 2018, now Pat. No. 11,540,189.

(51) Int. Cl.
*H04W 36/12* (2009.01)
*H04W 36/30* (2009.01)
*H04W 76/15* (2018.01)
*H04W 84/06* (2009.01)
*H04W 84/04* (2009.01)

(56) References Cited

U.S. PATENT DOCUMENTS

| | | | |
|---|---|---|---|
| 5,572,530 | A | 11/1996 | Chitre et al. |
| 6,157,834 | A | 12/2000 | Helm et al. |
| 6,272,315 | B1 | 8/2001 | Chang et al. |
| 6,614,769 | B1 | 9/2003 | Erlick et al. |
| 6,634,027 | B1 | 10/2003 | Johnson et al. |
| 6,726,152 | B2 | 4/2004 | Higgins |
| 7,065,321 | B2 | 6/2006 | Lim |
| 7,174,127 | B2 | 2/2007 | Otten et al. |
| 7,403,470 | B2 | 7/2008 | Lane et al. |
| 7,646,752 | B1 | 1/2010 | Periyalwar et al. |
| 8,190,084 | B1 | 5/2012 | Gunasekara |
| 8,787,237 | B2 | 7/2014 | Väre et al. |
| 8,787,903 | B2 | 7/2014 | Boustie et al. |
| 8,804,502 | B2 | 8/2014 | Henry et al. |
| 8,811,366 | B2 | 8/2014 | Ashrafi |
| 8,923,849 | B2 | 12/2014 | Monte et al. |
| 9,014,083 | B2 | 4/2015 | Boltz et al. |
| 9,369,883 | B2 | 6/2016 | Giffin et al. |
| 9,866,313 | B1 | 1/2018 | Murphy |
| 9,906,989 | B2 | 2/2018 | Buckle et al. |
| 9,948,380 | B1 | 4/2018 | Vos et al. |
| 9,998,900 | B1 | 6/2018 | Yoo |
| 10,045,326 | B2 | 8/2018 | Blanchard et al. |
| 10,243,791 | B2 | 3/2019 | Dosovitsky et al. |
| 2005/0153732 | A1 | 7/2005 | Stotelmyer et al. |
| 2005/0288012 | A1 | 12/2005 | Morgan |
| 2006/0050736 | A1* | 3/2006 | Segel ............... H04B 7/18591 370/542 |
| 2007/0083650 | A1 | 4/2007 | Collomb et al. |
| 2007/0123252 | A1 | 5/2007 | Tronc et al. |
| 2008/0261512 | A1 | 10/2008 | Milbrandt et al. |
| 2009/0154395 | A1 | 6/2009 | Park et al. |
| 2010/0048205 | A1 | 2/2010 | Guilford et al. |
| 2011/0136428 | A1 | 6/2011 | Ritter |
| 2012/0100801 | A1 | 4/2012 | Yuan et al. |
| 2012/0166622 | A1 | 6/2012 | Draznin et al. |
| 2012/0196579 | A1 | 8/2012 | Souissi et al. |
| 2013/0039275 | A1 | 2/2013 | Patil et al. |
| 2013/0070664 | A1 | 3/2013 | Nagata et al. |
| 2014/0213256 | A1 | 7/2014 | Meylan et al. |
| 2014/0355476 | A1 | 12/2014 | Anderson et al. |
| 2015/0085650 | A1* | 3/2015 | Cui .................... H04W 48/18 370/230 |
| 2015/0201460 | A1 | 7/2015 | Flynn |
| 2015/0358959 | A1 | 12/2015 | Meshkati et al. |
| 2016/0006500 | A1 | 1/2016 | Radpour |
| 2016/0028472 | A1 | 1/2016 | Valencia |
| 2016/0037422 | A1 | 2/2016 | Rost et al. |
| 2016/0173382 | A1 | 6/2016 | Körösi et al. |
| 2016/0381693 | A1 | 12/2016 | Sanda et al. |
| 2017/0055175 | A1 | 2/2017 | Leroux et al. |
| 2017/0063645 | A1 | 3/2017 | Testa et al. |
| 2017/0294957 | A1* | 10/2017 | Ravishankar ......... H04W 40/12 |
| 2018/0123932 | A1 | 5/2018 | Shaw et al. |
| 2018/0176143 | A1 | 6/2018 | Cui et al. |
| 2018/0199207 | A1 | 7/2018 | Zavesky et al. |
| 2018/0205449 | A1 | 7/2018 | Durvasula et al. |
| 2018/0205639 | A1 | 7/2018 | Zakaria et al. |
| 2018/0242189 | A1 | 8/2018 | Wang et al. |
| 2018/0302807 | A1 | 10/2018 | Chen et al. |
| 2019/0045421 | A1 | 2/2019 | Shah et al. |
| 2019/0150080 | A1 | 5/2019 | Davies et al. |
| 2019/0260464 | A1 | 8/2019 | Roy et al. |
| 2020/0244346 | A1 | 7/2020 | Goettle |

FOREIGN PATENT DOCUMENTS

| | | |
|---|---|---|
| WO | 2017220110 A1 | 12/2017 |
| WO | 2018065764 A1 | 4/2018 |

OTHER PUBLICATIONS

"Final Office Action received for U.S. Appl. No. 16/218,090", Apr. 15, 2021, 35 pages.

"Final Office Action received for U.S. Appl. No. 16/396,385", Jan. 1, 2021, 70 pages.

"Non-Final Office Action received for U.S. Appl. No. 16/218,090", Dec. 2, 2020, 61 pages.

"Non-Final Office Action received for U.S. Appl. No. 16/218,090", Sep. 28, 2021, 38 pages.

"Non-Final Office Action received for U.S. Appl. No. 16/396,385", Jul. 15, 2020, 74 pages.

"Non-Final Office Action received for U.S. Appl. No. 17/493,048", Oct. 6, 2022, 128 pages.

Artiga , et al., "Terrestrial-Satellite Integration in Dynamic 5G Backhaul Networks", 8th Advanced Satellite Multimedia 6 Systems Conference and the 14th Signal Processing for Space Communications Workshop (ASMS/SPSC), IEEE, 2016, 6 pages.

Courville , et al., "Hybrid satellite/terrestrial networks: State of the art and future perspectives", QShine Workshop: Satellite/Terrestrial Interworking, ACM, 2007, 8 pages.

Estrem , et al., "Portable Satellite Backhauling Solution for Emergency Communications", 5th Advanced Satellite Multimedia Systems Conference and the 11th Signal Processing for Space Communications Workshop, IEEE, 2010, pp. 262-269.

Evans , et al., "Integration of Satellite and Terrestrial Systems in Future Multimedia Communications", IEEE Wireless Communications, Oct. 2005, pp. 72-80.

Evans , et al., "The Role of Satellites in 5G", 7th Advanced Satellite Multimedia Systems Conference and the 13th Signal Processing for Space Communications Workshop (ASMS/SPSC), IEEE, 2014, pp. 197-202.

Grazia , et al., "Integration between Terrestrial and Satellite Networks: the PPDR-TC vision", The IEEE WiMob Workshop on Emergency Networks for Public Protection and Disaster Relief, 2014, pp. 77-84.

Lagunas , et al., "Carrier Allocation for Hybrid Satellite-Terrestrial Backhaul Networks", Communications Workshops ICC Workshops), IEEE International Conference, IEEE, 2017, 6 pages.

Taleb , et al., "Challenges, Opportunities, and Solutions for Converged Satellite and Terrestrial Networks", IEEE Wireless Communications, Feb. 2011, pp. 46-52.

Watts , et al., "5G Resilient Backhaul using Integrated Satellite Networks", 7th Advanced Satellite Multimedia Systems Conference and the 13th Signal Processing for Space Communications Workshop (ASMS/SPSC), IEEE, 2014, 6 pages.

* cited by examiner

FRAMEWORK FOR A 6G UBIQUITOUS ACCESS NETWORK

RELATED APPLICATION

The subject patent application is a continuation of, and claims priority to, U.S. patent application Ser. No. 18/054,999, filed Nov. 14, 2022, which is a continuation of, and claims priority to, U.S. patent application Ser. No. 16/218,090, filed Dec. 12, 2018, now U.S. Pat. No. 11,540,189, and entitled "FRAMEWORK FOR A 6G UBIQUITOUS ACCESS NETWORK," the entirety of which priority applications are hereby expressly incorporated by reference herein.

TECHNICAL FIELD

The subject disclosure relates generally to wireless communications, and to systems, apparatuses and methods facilitating a framework for a $6^{th}$ generation (6G) ubiquitous wireless communications network.

BACKGROUND 6G networks aim to provide enhanced speed, coverage and bandwidth as well as ubiquitous connectivity. Further, there is more potential for different applications and services, such as connected infrastructure, wearable computers, autonomous driving, Internet of Everything (IoE), seamless virtual reality, augmented reality and ultra-high-fidelity virtual reality (which consumes about 50 times the bandwidth of a high-definition video stream), etc. As used herein, the term "ubiquitous" as relates to a 6G network in the embodiments presented herein can mean a large or endless number of access technologies (including satellite networks) working together to create universal coverage and always-on broadband global network. For example, more integrated terrestrial wireless with satellite systems (with using specially designed nanoantennae) in the access network can be provided. However, existing radio networks such as long term evolution (LTE), 5G, and Wireless Fidelity (Wi-Fi) are very much independent and not communicatively coupled to satellite networks.

One or more embodiments described herein can advantageously provide an integrated network comprising a terrestrial wireless network and a satellite system to provide the fully connected broadband global network coverage and high bandwidth to efficiently deliver the applications and services.

DETAILED DESCRIPTION

Figure 1:
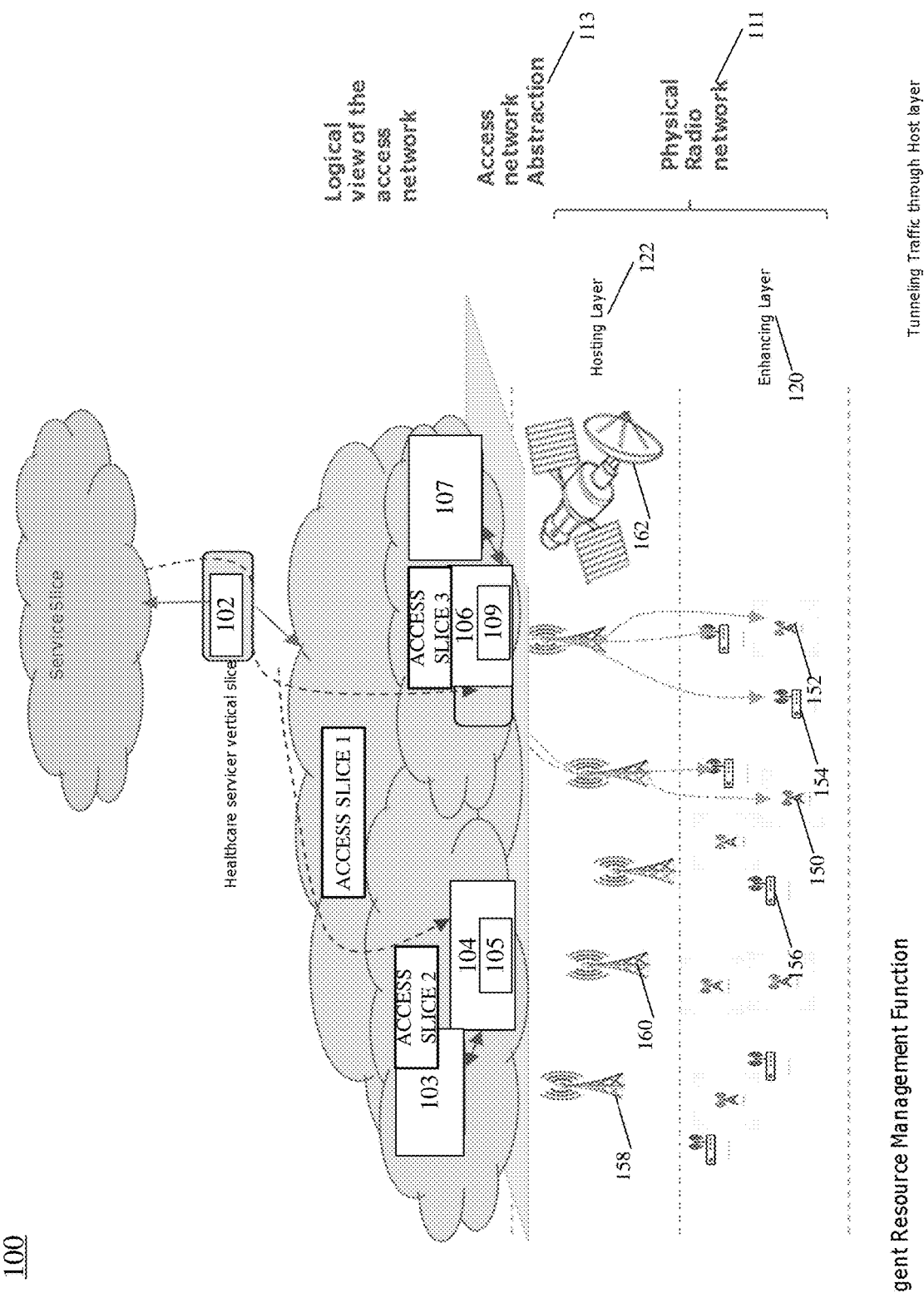
FIG. 1 illustrates an example schematic diagram of a system that facilitates a 6G ubiquitous wireless communications network in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Various embodiments can include systems, apparatus, methods and/or computer-readable storage media that facilitate a framework for a $6^{th}$ generation (6G) ubiquitous wireless communications network. One or more embodiments described herein, a system comprises: a processor; and a memory that stores executable instructions that, when executed by the processor, facilitate performance of operations. The operations can comprise: obtaining first information associated with a first condition of a terrestrial radio network of terrestrial radio networks from a terrestrial controller that collects the first information from the terrestrial radio network; determining second information associated with a resource of a satellite network, wherein the satellite network is integrated with the terrestrial radio networks to form an integrated network to which a mobile device connects, wherein a defined application is alternatively executable at the mobile device via any of a group of networks, the group comprising the satellite network and the terrestrial radio networks; and determining whether to re-assign a connection for the defined application from the terrestrial radio network to the satellite network based on a result of evaluating at least the first condition.

In some embodiments, a method, comprises: obtaining, by a device comprising a processor, first information associated with a first condition of a terrestrial radio network of terrestrial radio networks; determining, by the device, second information associated with a resource of a satellite network, wherein the satellite network is integrated with the terrestrial radio networks to form an integrated network to which a mobile device connects, and wherein a defined application is alternatively executable at the mobile device via an alternation, by the device, between the satellite network and the terrestrial radio networks; and determining, by the device, an assignment of the defined application between the terrestrial radio network and the satellite network based on at least the first information and the second information.

In some embodiments, a machine-readable storage medium, comprising executable instructions is provided that, when executed by a processor, facilitate performance of operations, comprising: receiving first information associated with a first condition of a terrestrial radio network of terrestrial radio networks from a terrestrial controller that collects the first information from the terrestrial radio networks; determining second information associated with a resource of a satellite network, wherein the satellite network is integrated with the terrestrial radio networks to form an integrated network to which a mobile device connects, wherein a defined application is executable at the mobile device via the satellite network or one of the terrestrial radio networks; and determining whether to re-assign the defined application from the terrestrial radio network to the satellite network based on at least the first condition.

One or more embodiments of the system of FIG. 1 described herein can advantageously integrate terrestrial wireless networks with a satellite system to provide fully connected broadband global network coverage to efficiently deliver applications and services. One or more embodiments can provide a framework for an integrated 6G radio network including not only 3GPP radio technologies and boosting or enhancing capabilities such as Wi-Fi, low-power wide-area network (LPWAN), long range (LoRa) radio access networks (RANs), etc., but also satellite networks. One or more embodiments can provide the abstraction of such integrated networks and solutions to enable intelligent service delivery with dynamic integrated radio resource control.

Turning now to the drawings, FIG. 1 illustrates an example schematic diagram of a system that facilitates a 6G ubiquitous wireless communications network in accordance with one or more embodiments described herein. 6G networks aim to provide enhanced speed, coverage and bandwidth as well as ubiquitous connectivity. Further, there is more potential for different applications and services, such as connected infrastructure, wearable computers, autonomous driving, Internet of Everything (IoE), seamless virtual reality, augmented reality and ultra-high-fidelity virtual reality (which consumes about 50 times the bandwidth of a high-definition video stream), etc. As used herein, the term "ubiquitous" as relates to a 6G network in the embodiments presented herein can mean a large or endless number of access technologies working together to create universal coverage and always-on broadband global network. For example, more integrated terrestrial wireless with satellite systems (with using specially designed nanoantennae) in the access network can be provided.

Shown in FIG. 1 is an integrated network comprising access devices facilitating access to one or more different networks (e.g., terrestrial networks and satellite networks). For example, the access device can comprise terrestrial controllers (e.g., macro cell base station devices, millimeter wave base station devices, femto cell access devices, Wi-Fi access point devices, and the like) that provide access to a terrestrial network (e.g., macro cell, micro cell, femto cell, etc.). Further, the terms "femto" and "femto cell" are used interchangeably, the terms "macro" and "macro cell" are used interchangeably and the terms "micro" and "micro cell" are used interchangeably. The satellite controller can be or include a satellite communication system in some embodiments.

As used herein, the term "terrestrial" means Earth-based. Thus, a terrestrial network can be any network that transmits and/or receives signals from Earth. By contrast, a satellite network can be a network that transmits and/or receives signals via satellite communication. Similarly, a terrestrial controller is a device that controls one or more aspects of communication, resource allocation or the like for a terrestrial network while a satellite controller is a device that controls one or more aspects of communication, resource allocation or the like for satellite communication.

As shown in FIG. 1, enhancing layers (e.g., enhancing layer 120) are those layers of the physical radio network 111 of the integrated network 110 that include one or more access devices/small networks (including, but not limited to, femto cells/femto cell access point devices such as femto cell access point devices 150, 152 and Wi-Fi/Wi-Fi access point devices 154, 156) that facilitate provisioning of more bandwidth locally within close proximity to the mobile device. Hosting layers (e.g., hosting layer 122) typically include one or more access or base station devices (e.g., base station devices 158, 160, satellite devices such as satellite device 162)/networks that are more substantial in coverage area (including, but not limited to, cellular communication via cells such as macro cells and satellite communication via satellite communication networks). The enhancing layer 120 and the hosting layer 122 comprises the physical radio network 111. The physical radio network 111 can comprise an integrated network. In one or more embodiments described herein, the integrated network can comprise a terrestrial network (not shown) and a satellite network (not shown) integrated with one or another via a controller (e.g., software-defined networking (SDN) controller 102) that communicates with both networks and provides intelligent access network selection. One or more terrestrial networks can exist for different types of networks, each terrestrial network controlled by a terrestrial controller. For example, terrestrial controllers (e.g., terrestrial controller 104) can be as shown in FIG. 1. Terrestrial controller 104, for example, can be or control an access point device for a femto cell (e.g., access point device 156) or for Wi-Fi (e.g., access point device 150), for example, while another terrestrial controller (not shown) can be or control a base station device (e.g., base station device 158) for a macro cell or millimeter wave network, for example. Satellite controller 134 can control one or more satellite networks in various embodiments. The terrestrial controllers (e.g., terrestrial controller 104) (and/or, in some embodiments, the mobile devices to which they are communicatively coupled) can communicate directly with SDN controller 102. Satellite controller 106 can communicate directly with the SDN controller 102.

The access network abstraction is a logical layer above the physical radio network and is the location of the integrated system of the embodiments described herein wherein the intelligent access network selection can be provided (e.g., via the SDN controller 102). The SDN controller 102 can select the best access technology/network for a particular mobile device and a given application or service in one or more embodiments as described below with reference to FIGS. 2, 3A, 3B, 4, 5, 6, 7, 8, 9 and/or 10. The SDN controller 102 can receive and evaluate information indicative of one or more aspects of the integrated network.

The access network abstraction 113 can be a logical view of one or more components or functionality that can determine the resources available (e.g., knowledge or information regarding where the resources are available, how much of the resource is available, the coverage of the resource, the condition of the resource, the connectivity between the access points) and/or assign terrestrial and/or satellite resources for provisioning one or more applications or services. Thus, the access network abstraction 113 can provide a logical view of the entire network, including both the terrestrial and the satellite networks. The knowledge is presented to the SDN controller 102 (which has the big picture of the ubiquitous access network) and can determine what resources to allocate to what devices and applications when it is needed. The SDN can control a system that integrates terrestrial and satellite networks to provide applications and/or services that meet various specifications and/or service levels in spite of ever-changing resources in the terrestrial and satellite networks. The system of FIG. 1 can integrate different types of devices and networks to provide access to different applications and services for users.

Embodiments described herein can be exploited in substantially any wireless communication technology, comprising, but not limited to, satellite or terrestrial, in general, and in particular, embodiments can include, but are not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), $5^{th}$ generation (5G), millimeter wave, high speed packet access (HSPA), Zigbee and other 802.XX wireless technologies and/or legacy telecommunication technologies.

Figure 2:
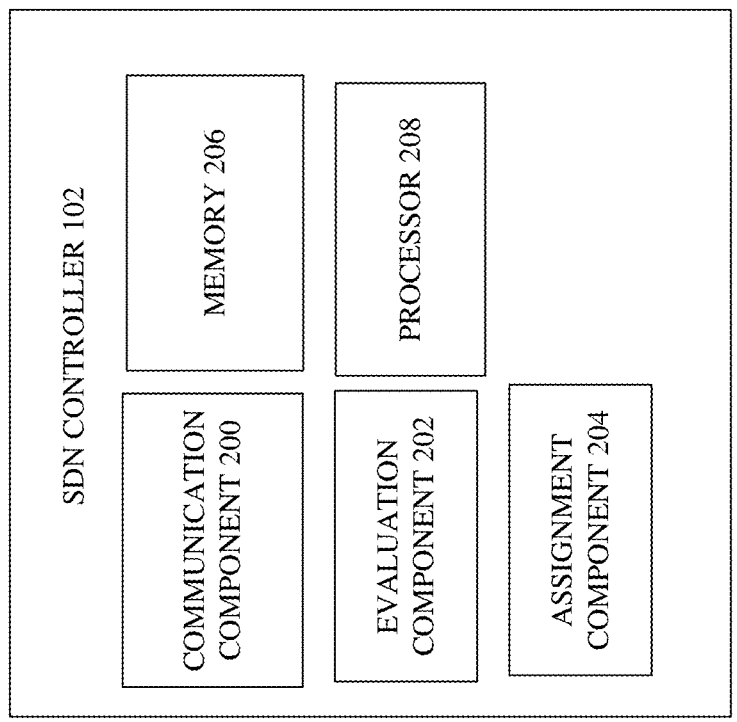
FIG. 2 illustrates an example block diagram of a SDN controller of a system that facilitates radio resource management for a 6G ubiquitous wireless communications network in accordance with one or more embodiments described herein.
Figure 3A:
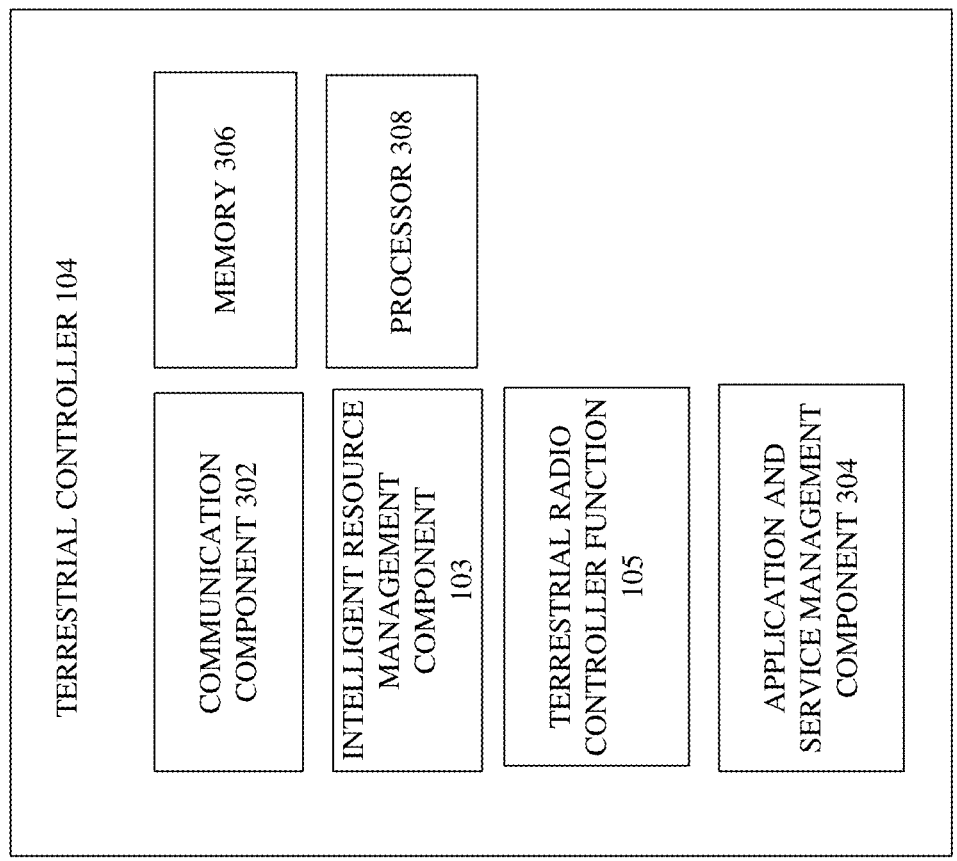
FIG. 3A illustrates an example block diagram of terrestrial controller of a system that facilitates radio resource management for a 6G ubiquitous wireless communications network in accordance with one or more embodiments described herein.
Figure 3B:
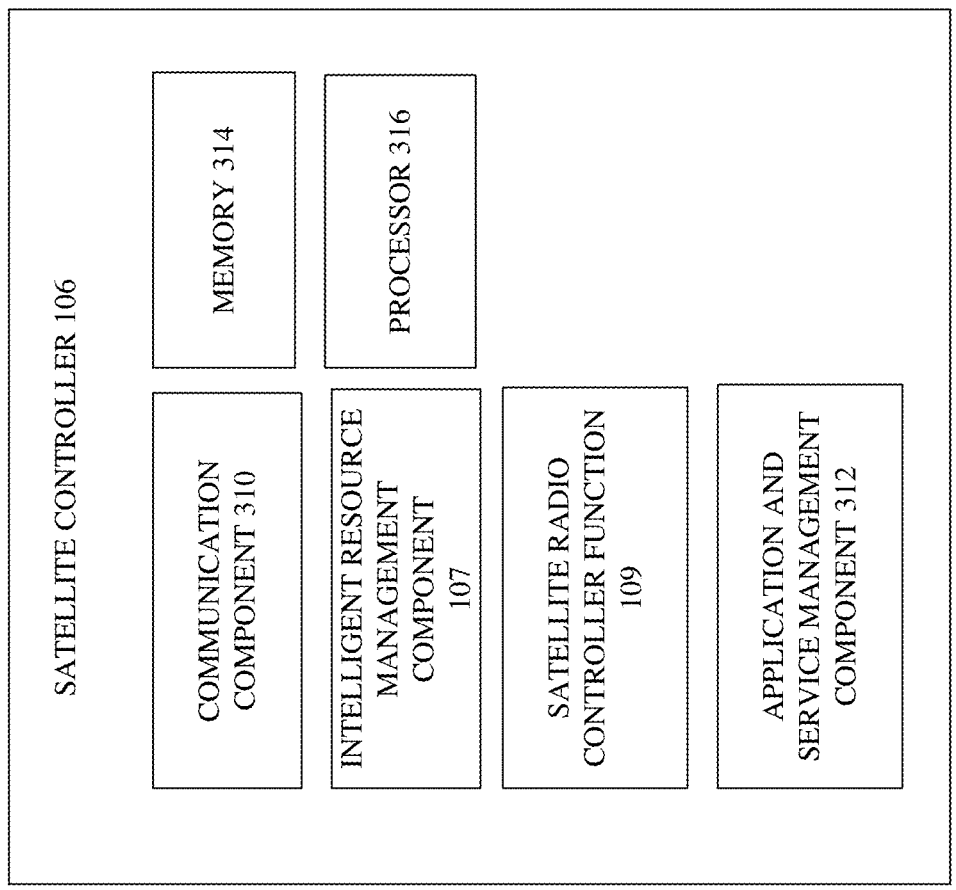
FIG. 3B illustrates an example block diagram of terrestrial controller of a system that facilitates radio resource management for a 6G ubiquitous wireless communications network in accordance with one or more embodiments described herein.

FIG. 2 illustrates an example block diagram of a SDN controller of a system that facilitates radio resource management for a 6G ubiquitous wireless communications network in accordance with one or more embodiments described herein. FIG. 3A illustrates an example block diagram of terrestrial controller of a system that facilitates radio resource management for a 6G ubiquitous wireless communications network in accordance with one or more embodiments described herein. FIG. 3B illustrates an example block diagram of satellite controller (e.g., satellite controller 106) of a system that facilitates radio resource management for a 6G ubiquitous wireless communications network in accordance with one or more embodiments described herein. Repetitive description of like elements employed in other embodiments described herein is omitted for sake of brevity.

The SDN controller 102, terrestrial controller 104 and satellite controller 106 will now be described. The SDN can comprise a communication component 200, an evaluation component 202, an assignment component 204, a memory 206 and/or a processor 208. In some embodiments, one or more components of the SDN controller 102 can be software, hardware or a combination of software and hardware. The communication component 200, an evaluation component 202, an assignment component 204, a memory 206 and/or a processor 208 can be electrically and/or communicatively coupled to one another to facilitate management of an integrated 6G network that includes a satellite network and a terrestrial network that is employed to provide one or more applications and/or services to mobile devices.

The terrestrial controller 104 comprise a communication component 104, an intelligent resource management component 103 to determine and/or receive information or resources needed, requested or suitable for one or more resources for an application and/or service for a mobile device, a terrestrial radio controller function 105, an application and service management component 304, that provides the resources indicated by the SDN controller 102 to provide the applications and/or services to the mobile device 108, a memory 306 and/or a processor 312. The intelligent resource management component 103 and/or the terrestrial radio controller function 105 can communicate directly with the SDN controller and service layer and can determine the resources needed both on the access and backhaul networks. In some embodiments, one or more components of the terrestrial controller 104 can be software, hardware or a combination of software and hardware. The communication component 104, intelligent resource management component 103 to determine and/or receive information or resources needed, requested or suitable for one or more resources for an application and/or service for a mobile device, a terrestrial radio controller function 105, an application and service management component 304 can be electrically and/or communicatively coupled to one another to facilitate management of an integrated 6G network that includes a satellite network and a terrestrial network that is employed to provide one or more applications and/or services to mobile devices.

The satellite controller 106 can comprise a communication component 310, an intelligent resource management component 107, a satellite radio controller function 109, an application and service management component 312, a memory 314 and/or a processor 316. In some embodiments, one or more components of the satellite controller 106 can be software, hardware or a combination of software and hardware. The communication component 310, intelligent resource management component 107, satellite radio controller function 109, application and service management component 312, a memory 314 and/or a processor 316 can be electrically and/or communicatively coupled to one another to facilitate management of an integrated 6G network that includes a satellite network and a terrestrial network that is employed to provide one or more applications and/or services to mobile devices. The intelligent resource management component 107 and/or satellite radio controller function 109 can control the resources both in the access and backhaul networks and provide a feedback to the system as a form of artificial intelligence (AI) to further improve a prediction of resources needed for different services in the network.

Turning back to FIGS. 2, 3A and 3B, the communication component 104 of the terrestrial controller 104 or the mobile device 108 of the terrestrial controller 104 can transmit to the communication component 200 of the SDN controller 102 and/or receive from the SDN controller 102 information indicative of one or more resources at a terrestrial network controlled by one or more terrestrial controllers (e.g., terrestrial controllers 104). The communication component 310 of the satellite controller 106 can transmit information to and/or receive information indicative of one or more resources at a satellite network controlled by the satellite controller 106. For example, the communication component 200 of SDN controller 102 can receive (e.g., from one or more mobile devices such as mobile device 108 or from the terrestrial radio controller function 105 of the terrestrial controller 104) information indicative of resources at a terrestrial network corresponding to terrestrial controller 104 including, but is not limited to, the access load, the backhaul load, the available bandwidth and any number of other aspects of the network (including those shown in FIG. 4) or one or more applications or services requested by a mobile device such as mobile device 108. In some embodiments, the SDN controller 102 can also determine and/or receive information indicative of resources at a satellite network controlled by satellite controller 106. For example, available bandwidth can be transmitted to the SDN controller 102 from the satellite controller 106.

Figure 4:
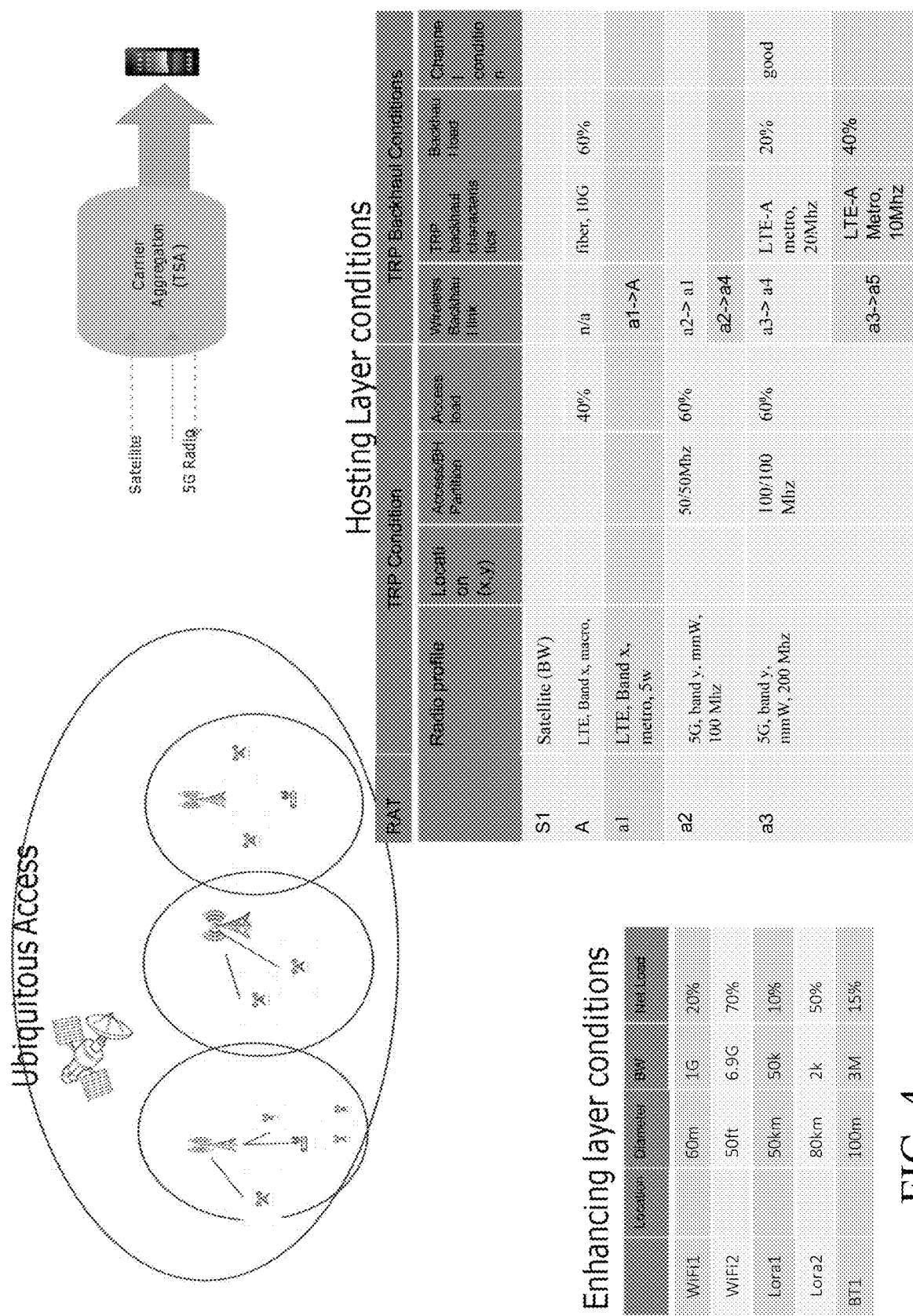
FIG. 4 illustrates example embodiments of characteristics and aspects of a system that facilitates a 6G ubiquitous wireless communications network in accordance with one or more embodiments described herein.

Turning briefly to FIG. 4, illustrated are example embodiments of characteristics and aspects of a system that facilitates a 6G ubiquitous wireless communications network in accordance with one or more embodiments described herein. As shown in FIG. 4, ubiquitous access to applications and/or services can be provided from an integrated network 110 including satellite resources and terrestrial resources. FIG. 4 is an example of one or more abstraction of the access network in some embodiments.

The enhancing layer 120 includes networks including, but not limited to, LoRA, WI-FI, Bluetooth (BT1), etc. (one or more of which can be controlled by one or more different terrestrial controllers). The information shown in the enhancing layer 120 can be an example of the resources of the different terrestrial networks shown. By way of example, but not limitation, the location, diameter, bandwidth (BW) and/or load condition. For example, as shown in the enhancing layer 120 of FIG. 4, the Wi-FI1 has a coverage area with diameter of 60 meters (m), 1 Gigahertz (G) bandwidth and loading (e.g., this may be access load or backhaul load depending on the network) of 20 percent while Lora1 has a coverage area with diameter of 50 km, 50 kilohertz (k) bandwidth and loading of 10 percent. The enhancing layer 120 can show the value of various aspects at a particular time and the resources can change from time to time. For example, if the coverage, bandwidth and/or the load condition (e.g., access load or the backhaul load) at that time. The values provided are merely examples and in other embodiments, the parameters (e.g., coverage area diameter, bandwidth and loading) can have different values.

The hosting table of the hosting layer 122 can show the resources of larger networks such as macro cells, micro cells, satellites and other large networks. In the table, various radio access technology (RAT) and example resources and values for those resources are shown. For example, S1 can be a satellite network, A can be a macro cell, a1 and a2 can be LTE or 5G micro cells and a 5G millimeter wave network area, respectively, as shown. Similarly, a3 can be a 5G millimeter wave network area also. Any number of different types of terrestrial network can be employed. The location column can represent the longitude and latitude location of the coverage area of the cell, the access/BH partition can represent the partitioning of access and backhaul within the cell (e.g., for the a2, the example shows that 50 percent of the channel is for access by the mobile device and 50 percent of the channel is for the backhaul. As of the nature of Nano antenna farming and satellite access through those antennas, it enables the access to add and remove to the pool of antennas dynamically while a session is in process versus the pre allocation of resources prior to session initiation, which is the case in conventional systems.

The values in the columns of the hosting table are merely examples of various embodiments of aspects of different terrestrial networks or satellite networks. Other values can also be employed and communicated to the SDN controller from time to time. For example, A, can be the LTE cell site and has macro site. This applies to 5G millimeter wave, which is for a very wide spectrum so all 100 percent (the Access/BH Partition would indicate 100%) of A is dedicated for access (there is no partitioning). A2 is millimeter wave. It is a 5G cell. The y of band y can be 2.8 GHz. The width of the bandwidth is 700 Megahertz (MHz) partitioned between the wireless backhaul and another portion of the bandwidth. The bandwidth for a1 is not partitioned. Access load is 50% and backhaul is through a1 to a2 to A from a2 to a4 from a2 to a1 to A. For a2 there are two possible wireless backhauls (to a1 and to a4), depending on the conditions/resources available on a1. The information in the wireless backhaul link column can be the same as the information in the access column in some embodiments.

Turning back to FIGS. 2, 3A and 3B, memory 206 can be a computer-readable storage medium storing computer-executable instructions and/or information configured to perform one or more of the functions described herein with reference to the SDN controller 102 (or any components of the SDN controller 102) including, but not limited to, evaluating one or more resources of a terrestrial network and/or a satellite network, assigning resources for an application or a service from one or a combination of a terrestrial network and a satellite network, communicating information to control a terrestrial controller or a satellite controller to provide resources (or to provide defined resources identified by the SDN controller 102) to a mobile device or the like. The processor 210 can perform one or more of the functions described herein with reference to the SDN controller 102. As such, a data storage (not shown) within or communicatively coupled to the SDN controller 102 can store information for use by the memory 206 and processor 210 comprising, but not limited to, policy information or rules for handling or provisioning of different applications or services, service level agreement information for one or more entities associated with a mobile device, quality of experience information or subscription information from an entity associated with a user mobile device, status of a buffer of a mobile device, status of one or more resources (e.g., access load, backhaul load, bandwidth) for one or more terrestrial networks or a satellite network, assigned resources for one or more mobile devices, terrestrial networks or satellite networks, and the like.

With regard to the terrestrial controller 104, memory 306 can be a computer-readable storage medium storing computer-executable instructions and/or information configured to perform one or more of the functions described herein with reference to the terrestrial controller 104 (or any components of the terrestrial controller 104) including, but not limited to, evaluating and/or communicating information indicative of one or more resources of a terrestrial network, receiving and/or transmitting resources for an application or a service from/to a terrestrial network, communicating information to the SDN controller 102 for provisioning resources to a mobile device in the terrestrial network. The processor 308 can perform one or more of the functions described herein with reference to the terrestrial controller 104. As such, a data storage (not shown) within or communicatively coupled to the terrestrial controller 104 can store information for use by the memory 306 and processor 308 comprising, but not limited to, policy information or rules for handling or provisioning of different applications or services, service level agreement information for one or more entities associated with a mobile device, quality of experience information or subscription information from an entity associated with a user mobile device, status of a buffer of a mobile device, status of one or more resources (e.g., access load, backhaul load, bandwidth) for one or more terrestrial networks, assigned resources for one or more mobile devices, terrestrial networks and the like.

With regard to the satellite controller 106, memory 314 can be a computer-readable storage medium storing computer-executable instructions and/or information configured to perform one or more of the functions described herein with regard to the satellite controller 106, (or any components of the satellite controller 106) including, but not limited to, evaluating one or more resources of a satellite network, assigning resources for an application or a service from the satellite network, communicating information to provide resources to a mobile device (the resources being resources of the satellite and the type and amount of the resources being dictated by the SDN controller 102) or the like. The processor 316 can perform one or more of the functions described herein with reference to the n. As such, a data storage (not shown) within or communicatively coupled to the satellite controller 106 can store information for use by the memory 314 and processor 316 comprising, but not limited to, policy information or rules for handling or provisioning of different applications or services, service level agreement information for one or more entities associated with a mobile device, quality of experience information or subscription information from an entity associated with a user mobile device, status of a buffer of a mobile device, status of one or more resources (e.g., access load, backhaul load, bandwidth) for the satellite network, assigned resources for one or more mobile devices, terrestrial networks or satellite networks, and the like.

Figure 5:
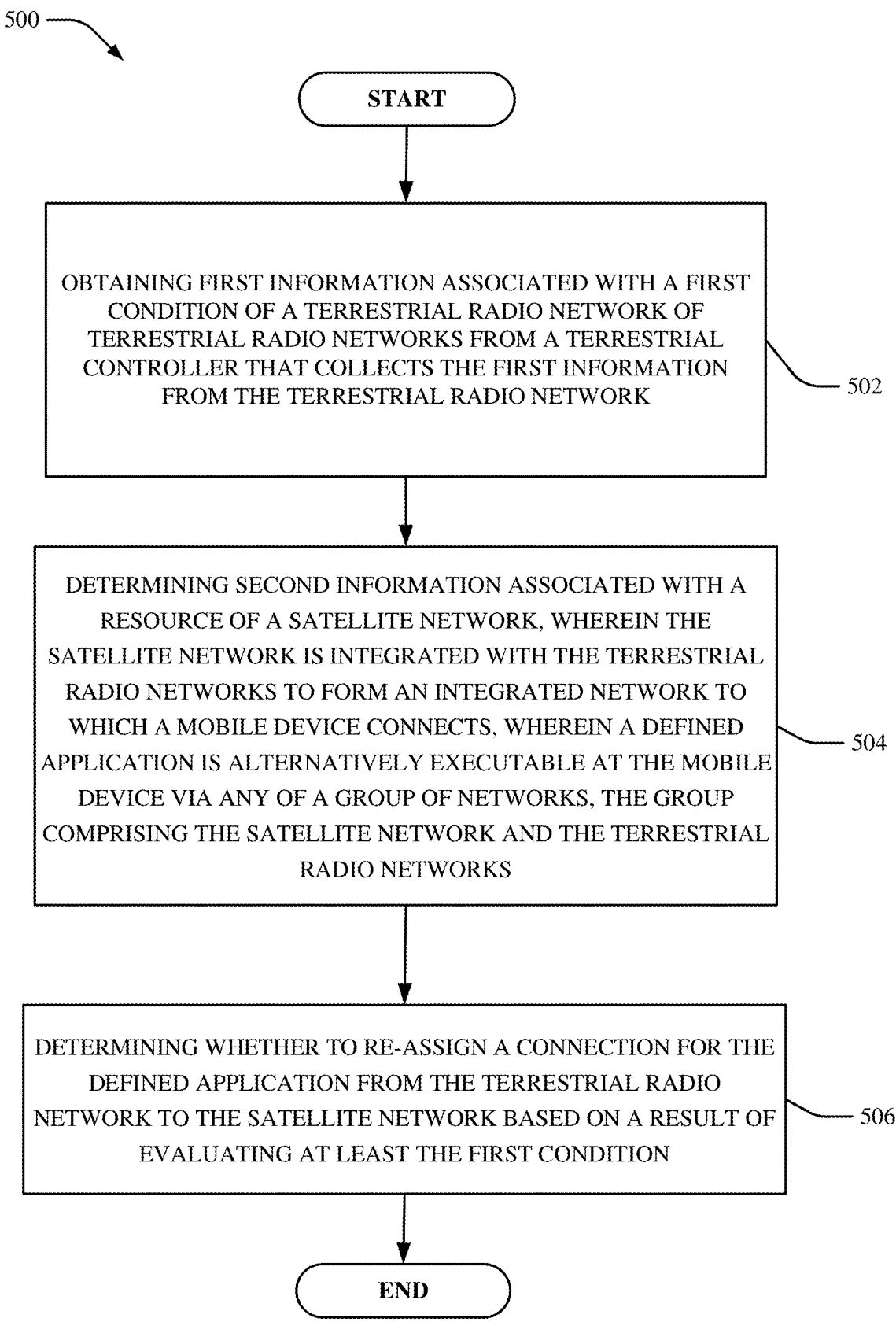
FIGS. 5, 6 and 7 are flowcharts of methods that facilitate a framework for a 6G ubiquitous wireless communications network in accordance with one or more embodiments described herein.
Figure 6:
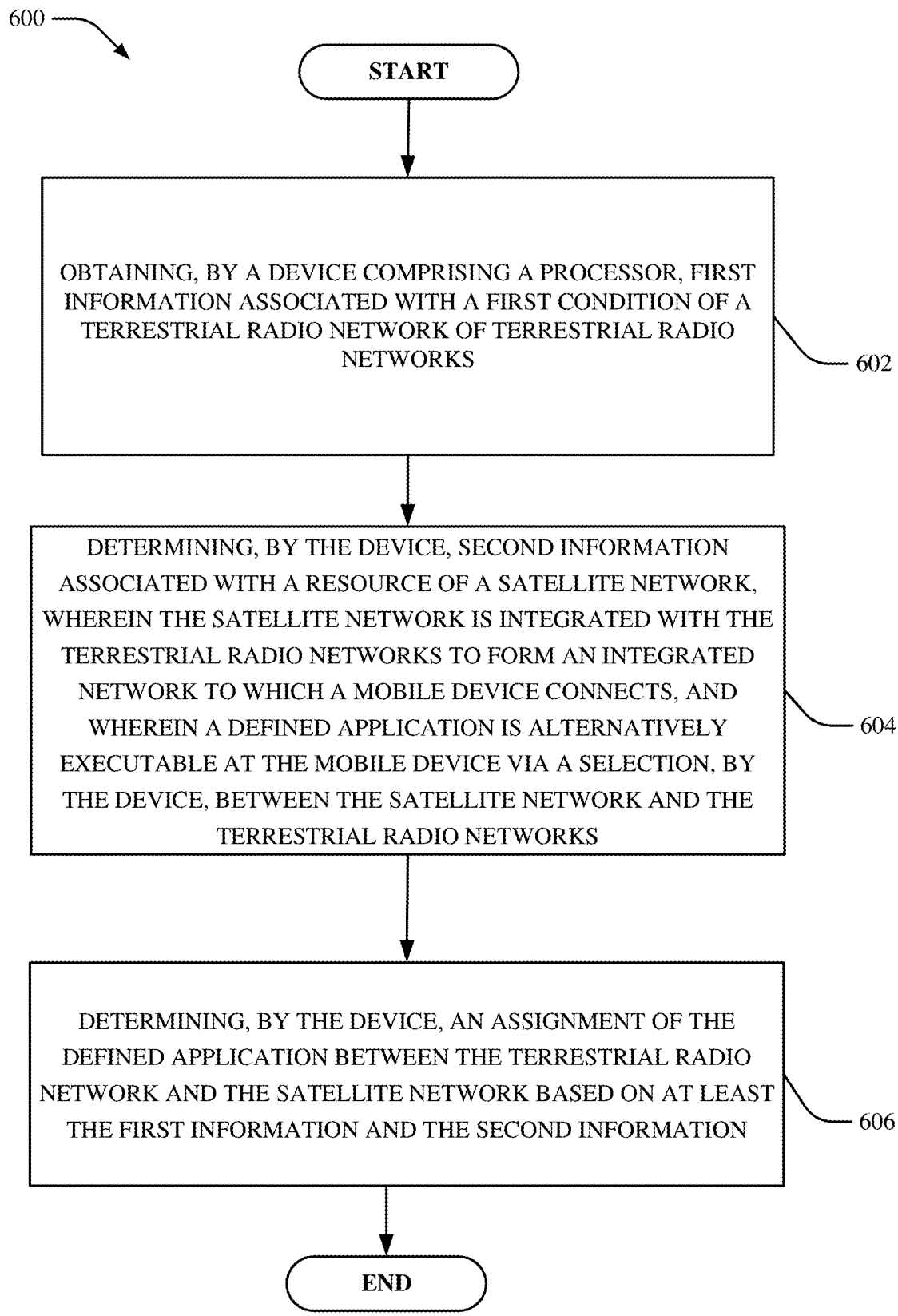
Figure 7:
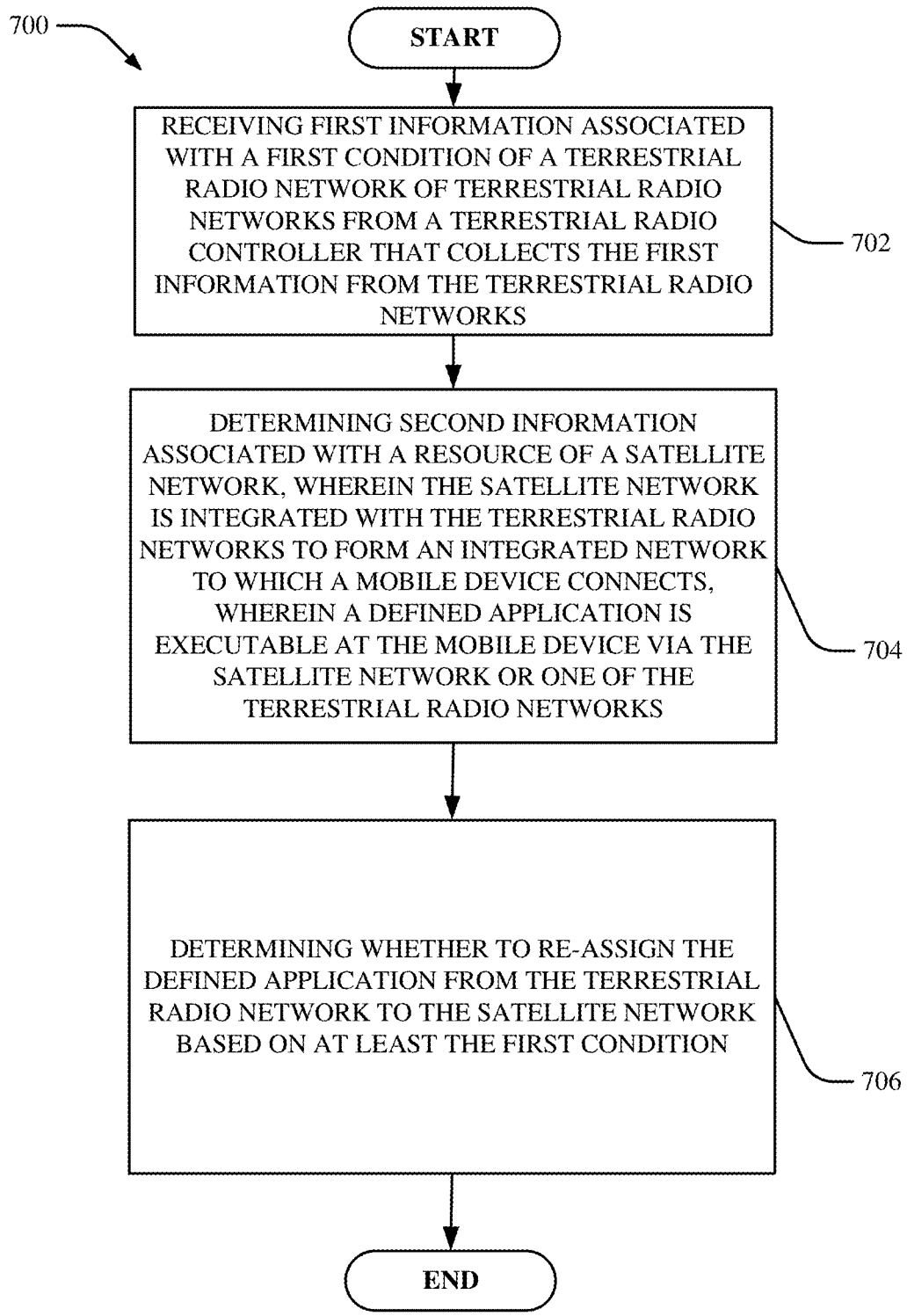

FIGS. 5, 6 and 7 are flowcharts of methods that facilitate a framework for a 6G ubiquitous wireless communications network in accordance with one or more embodiments described herein. In some embodiments, one or more aspects of the methods can be performed by an SDN controller (e.g., SDN controller 102). For example, the SDN controller 102 can operate in conjunction with the terrestrial controller 104 and/or the satellite controller 106 over an integrated network to provide one or more applications or services.

Turning to FIG. 5, at 502, method 500 can comprise obtaining first information associated with a first condition of a terrestrial radio network of terrestrial radio networks from a terrestrial controller that collects the first information from the terrestrial radio network. In some embodiments, the integrated network is adapted to operate according to a 6G telecommunication protocol.

In some embodiments, the obtaining the first information is performed periodically based on a periodic collection of the first information by the terrestrial controller. In some embodiments, the obtaining the first information is performed based on detection of change in a result of the evaluating the first condition by a defined amount by a component of the terrestrial radio network.

The evaluating the first condition comprises evaluating a loading of the terrestrial radio network relative to the resource of the satellite network, wherein the satellite network is controlled by a satellite controller. The first information can comprise a buffer status of the terrestrial radio network transmitted from the terrestrial radio network based on a change in the buffer status, and wherein the evaluating the first condition comprises evaluating a subscription for the defined application. In some embodiments, the first information comprises an access load condition and a backhaul load condition of the terrestrial radio network.

In some embodiments, the obtaining the first information is performed based on detection of change in a result of the evaluating the first condition by a defined amount by a component of the terrestrial radio network.

At 504, method 500 can comprise determining second information associated with a resource of a satellite network, wherein the satellite network is integrated with the terrestrial radio networks to form an integrated network to which a mobile device connects, wherein a defined application is alternatively executable at the mobile device via any of a group of networks, the group comprising the satellite network and the terrestrial radio networks. For example, the SDN controller 102 can selectively control the defined application to be executable at the satellite network or at one of the terrestrial radio networks.

At 506, method 500 can comprise determining whether to re-assign a connection for the defined application from the terrestrial radio network to the satellite network based on a result of evaluating at least the first condition. In some embodiments, the first condition comprises a loading or bandwidth of the terrestrial radio network relative to the resource of the satellite network. In some embodiments, the first condition further comprises a buffer status of the terrestrial radio network transmitted from the terrestrial radio network based on a change in the buffer status, and wherein the first condition also takes into account a subscription for the defined application or a quality of experience received from an entity to whom the defined application is to be provided.

Turning now to FIG. 6, at 602, method 600 can comprise obtaining, by a device comprising a processor, first information associated with a first condition of a terrestrial radio network of terrestrial radio networks. In some embodiments, the obtaining the first information is performed periodically based on a periodic collection of the first information of a terrestrial controller of the terrestrial radio networks.

At 604, method 600 can comprise determining, by the device, second information associated with a resource of a satellite network, wherein the satellite network is integrated with the terrestrial radio networks to form an integrated network to which a mobile device connects, and wherein a defined application is alternatively executable at the mobile device via a selection, by the device, between the satellite network and the terrestrial radio networks.

At 606, method 600 can comprise determining, by the device, an assignment of the defined application between the terrestrial radio network and the satellite network based on at least the first information and the second information.

In some embodiments, the first condition comprises an access load condition of the terrestrial radio network relative to the resource of the satellite network, and is based on a subscription of an entity associated with the mobile device. In some embodiments, the first condition comprises an access load condition of the terrestrial radio network relative to the resource of the satellite network and an acceptable service level of the defined application. In some embodiments, the first information comprises a buffer status of the terrestrial radio network received by the system based on a change in the buffer status, and wherein the first condition takes into account a quality of experience received from an entity to whom the defined application is to be provided.

Turning to FIG. 7, at 702, method 700 can comprise receiving first information associated with a first condition of a terrestrial radio network of terrestrial radio networks from a terrestrial controller that collects the first information from the terrestrial radio networks. In some embodiments, receiving the first information is performed aperiodically based on an aperiodic collection of the first information by the terrestrial controller at specified times. The receiving the first information can be performed based on detection of change in the first condition by a defined amount by a component of the terrestrial radio network. The receiving the first information can be performed based on detection of change in the first condition by a defined amount by a component of the terrestrial radio network. In some embodiments, the receiving the first information is performed based on detection of change in the first condition by a defined amount by a component of the terrestrial radio network.

In some embodiments, the first condition factors in a bandwidth of the terrestrial radio network relative to the resource of the satellite network. In some embodiments, the first condition factors in a buffer status of the terrestrial radio network transmitted from the terrestrial radio network based on a change in the buffer status, and wherein the first condition further factors in a subscription for the defined application or a quality of experience received from an entity to whom the defined application is to be provided.

At 704, method 700 can comprise determining second information associated with a resource of a satellite network, wherein the satellite network is integrated with the terrestrial radio networks to form an integrated network to which a mobile device connects, wherein a defined application is executable at the mobile device via the satellite network or one of the terrestrial radio networks.

At 706, method 700 can comprise determining whether to re-assign the defined application from the terrestrial radio network to the satellite network based on at least the first condition. In some embodiments, the first condition factors in a bandwidth of the terrestrial radio network relative to the resource of the satellite network. In some embodiments, the first condition factors in a buffer status of the terrestrial radio network transmitted from the terrestrial radio network based on a change in the buffer status, and wherein the first condition further factors in a subscription for the defined application or a quality of experience received from an entity to whom the defined application is to be provided.

In some embodiments, the receiving the first information is performed aperiodically based on an aperiodic collection of the first information by the terrestrial controller at specified times. The receiving the first information can be performed based on detection of change in the first condition by a defined amount by a component of the terrestrial radio network. The first information can comprise an access load condition and a backhaul load condition of the terrestrial radio network. The SDN controller 102 can take into account factors in making decisions regarding assignment of one or more resources for an application and/or service a mobile device 108 is executing or will execute.

Figure 8:
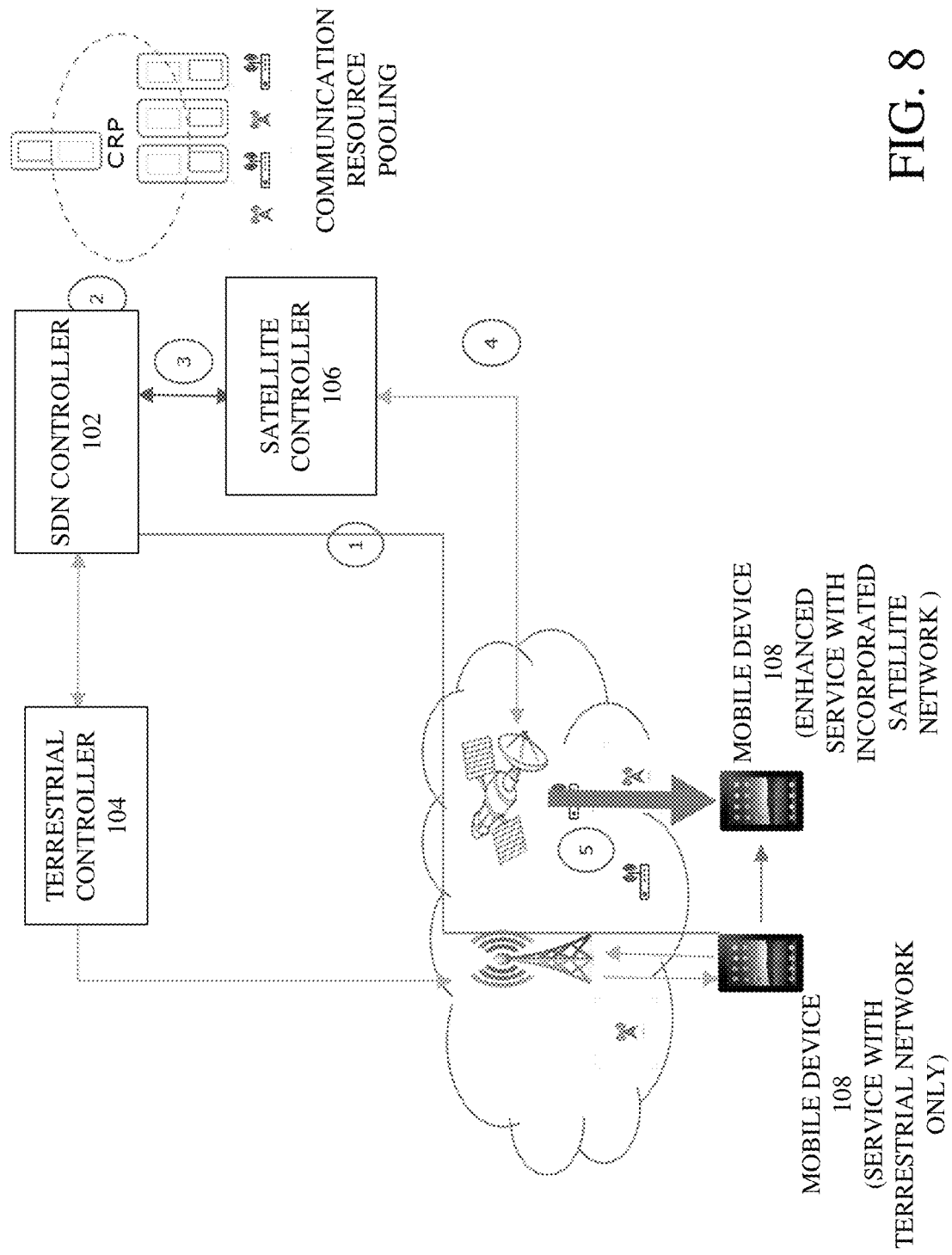
FIG. 8 illustrates an example schematic diagram of a system that facilitates radio resource management for a 6G ubiquitous wireless communications network in accordance with one or more embodiments described herein.
Figure 9:
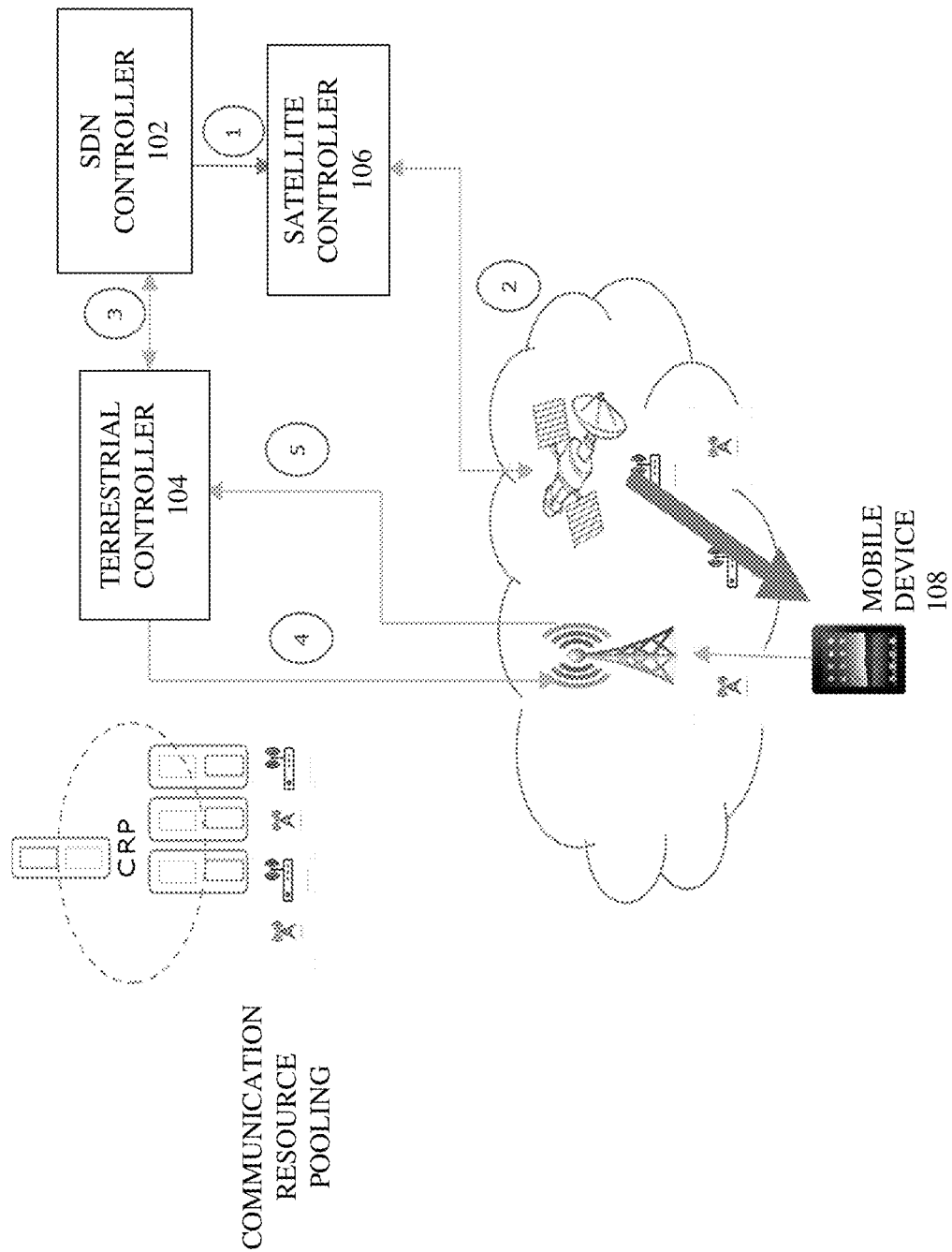
FIG. 9 illustrates another example schematic diagram of a system that facilitates radio resource management for a 6G ubiquitous wireless communications network in accordance with one or more embodiments described herein.

FIG. 8 illustrates an example schematic diagram of a system that facilitates radio resource management for a 6G ubiquitous wireless communications network in accordance with one or more embodiments described herein. FIG. 9 illustrates another example schematic diagram of a system that facilitates radio resource management for a 6G ubiquitous wireless communications network in accordance with one or more embodiments described herein.

Turning first to FIG. 8, an example of integrated 6G radio resource management is shown. In step 1, a car is detected in an urban area with LTE/5G coverage. While driving to an area with less LTE/5G coverage, a mobile device 108 located in the car or in the possession of a user of the mobile device 108 in the car can provide feedback to the terrestrial controller (e.g., terrestrial controller 104) or SDN controller 102 about 4G coverage and/or lack of LTE/5G coverage to obtain more resources assigned from the SDN controller 102. For example, a passenger may be watching video and therefore require high bandwidth so the mobile device 108 can run the video application and even though 5G has high bandwidth, satellite has greater bandwidth so the terrestrial controller 104 for the mobile device 108 contacts the SD controller 102 and requests re-allocation of bandwidth to the mobile device 108 for the video application.

At step 2, upon the reception of the mobile device 108 feedback by the SDN controller 102 (either directly or via the terrestrial controller 104), the SDN controller 102 can take into account the service level agreement (SLA) for the entity/user associated with the mobile device 108 (e.g., the Quality of Service for which the entity/user has a subscription), and the services/application being executed on the mobile device 108 or that the mobile device 108 has requested, and/or services policy (e.g., whether the application is a latency-tolerated application, whether the entity has a subscription that indicates the entity is a non-premium or a premium customer, the policy for handling the application or any number of other policy-based factors) to decide to send more data for the mobile device 108 by satellite network (by the SDN controller 102 transmitting information to the satellite controller 106 to cause the satellite controller 106 to begin to provide the service/application or at least a portion of the service/application) in lieu of or in addition to the current terrestrial radio/network to which the mobile device 108 is communicatively coupled to receive the services/application data. The SDN controller 102 can determine information/resources available from a satellite network and the information/resources available from the terrestrial network serving the mobile device 108. In some embodiments, the terrestrial controller 104 can receive information from one or more terrestrial networks (e.g., macro cell or millimeter wave or other terrestrial network).

At step 3, the SDN controller 102 sends the satellite controller 106 a request sending more data to the mobile device 108 via the satellite network. At step 4, the satellite radio controller function 109 of the satellite controller 106 can request the satellite to send more data to the mobile device 108. At step 5, the mobile device 108 receives more data/bandwidth for the video application via the satellite network providing bandwidth.

In some embodiments, how the application is provided to the mobile device using the terrestrial network or the satellite network can depend on one or more variables. For example, the agreed upon service level agreement (SLA) with the user/customer/entity can determine what resources to use for what services (e.g., high value resources being 5G NR and satellite considered low/affordable resource in the spectrum of resources). In some embodiments, the prior AI feedback from the system can decide what resource is the best fit to what services in addition to employing the SLA. This terrestrial network and satellite network integration helps achieving universal coverage and increased bandwidth.

Thus, the SDN controller 102 can determine information/resources available from a satellite network and the information/resources available from a terrestrial network. In some embodiments, the terrestrial controller 104 can receive information from one or more terrestrial networks (e.g., macro cell or millimeter wave or other terrestrial network). As such, periodically, the information is collected that is sent by the mobile device 108 radios (or terrestrial network radio) to the terrestrial controller and providing information indicating that bandwidth access of the terrestrial network has changed by a certain amount or percent (e.g., 5 percent). Thus, the information from the terrestrial controller 104 can be sent in response to percent of the change (e.g., 5 percent change) or periodically sent as time passes (every minute). As such, the terrestrial controller 104 can report the radio resource change. The changes can include, but are not limited to, the access load and backhaul load. Accordingly, the radio of the mobile device 108 can update the terrestrial controller 104. On the other hand, the radio SDN controller 102, if it needs to get more updated information, it can pool the radios to request information on the current condition. The pooling of resources is possible both nano antenna pooling as well as packaging the access resources as a slice and offered to the customers/users/entities as an option for different price and services. As such, the terrestrial controller has the information regarding the general topology of how a1 is connected to A and how a2 to connected to a1. So those cells, links a1, a2 and A can update the terrestrial controller about their access load condition and the backhaul load condition. Accordingly, the terrestrial controller 104 has a great view about what devices are connecting to what networks and what load conditions are on each link.

Also, the terrestrial controller 104 can provide information to the SDN controller 102 about what is happening/current state in the terrestrial network. The satellite controller 106 can provide to the SDN controller 102 information about how much load is on the satellite network.

Accordingly, the SDN controller 102 can collect information from the terrestrial network and the satellite network and then also know about the applications (how much or what applications require for more real-time service versus non-real-time network support) and also that information from a policy server (e.g., the policy server can talk to the SDN controller 102 and indicate that for a particular type of application, use satellite or do not use satellite). Other information that the SDN controller 102 can consider is whether a subscription exists for a user for a particular service (e.g., service tier based policy can be information that the SDN controller 102 also takes into account). As such, based on the network conditions and policy, the SDN controller 102 can make decision on whether to trigger the satellite for this providing a particular application to a particular mobile device (or whether to use a particular terrestrial network versus another terrestrial network for a particular application).

Once the control happens (or before the control happens) from the controller 102 there can also be feedback from the user/entity (mobile device). At any time, the mobile device can report buffer status (e.g., and possibly asking for resources). This buffer status or request for bandwidth can be sent to the terrestrial controller and this can be sent to the SDN controller 102 and taken into acct. to trigger the satellite or other solution. The device level offers visibility—the device can be visible to the SDN controller 102 in some embodiments.

In some embodiments, there can be an end user experience taken into account by the SDN controller 102 so the SDN controller 102 (or a device or storage that the SDN controller 102 can access) can collect quality of experience (QoE) information about the end user experience for the video application, etc. and such can be taken into by the controller 102 for further SDN controller 102 decision-making Turning now to FIG. 9, based on the subscription of the entity associated with the mobile device 108 (e.g., bronze subscription) and the application being executed or requested to be executed on the mobile device 108 (e.g., a large file downloading), to improve the overall system capacity, the SDN controller 102 instructs the satellite radio controller function (SRCF) 109 of the satellite controller 106 to schedule the large file downloading to the mobile device 108 to be performed over a satellite network, which is controlled by the satellite controller 106. At step 2, based on the information, the SRCF 109 schedules the satellite network for sending the data to the mobile device 108. At step 3, for other applications, such as voice, the SDN controller 102 instructs the terrestrial radio controller function (TRCF) 105 of the terrestrial controller 104 on how much bandwidth is needed for the 5G radio to allocate for the mobile device 108. At step 4, the TRCF 105 schedules the radio resources to the mobile device based on the input from the SDN controller 102. At step 5, the mobile device 108 can provide input about its buffered packets (queue the buffer status of the mobile device 108) can further communicate to the SDN controller 102 for further refinement of the resource allocation. With regard to communication resource pooling, resources can be pooled through resource management and service layer agreement (SLA). While the session is initiated to the given service, the pooled resource can be employed as needed, dynamically while the session is in progress.

Accordingly, one or more embodiments can provide higher speeds for a mobile device by aggregating 5G or other terrestrial radio and satellite ubiquitous coverage for improved coverage by leveraging satellite coverage when needed. A seamless and robust user experience can be provided by the systems described herein as controlled by leveraging reliable licensed spectrum e.g., for control and signaling. This solution can be used with any carrier and/or vendor.

Figure 10:
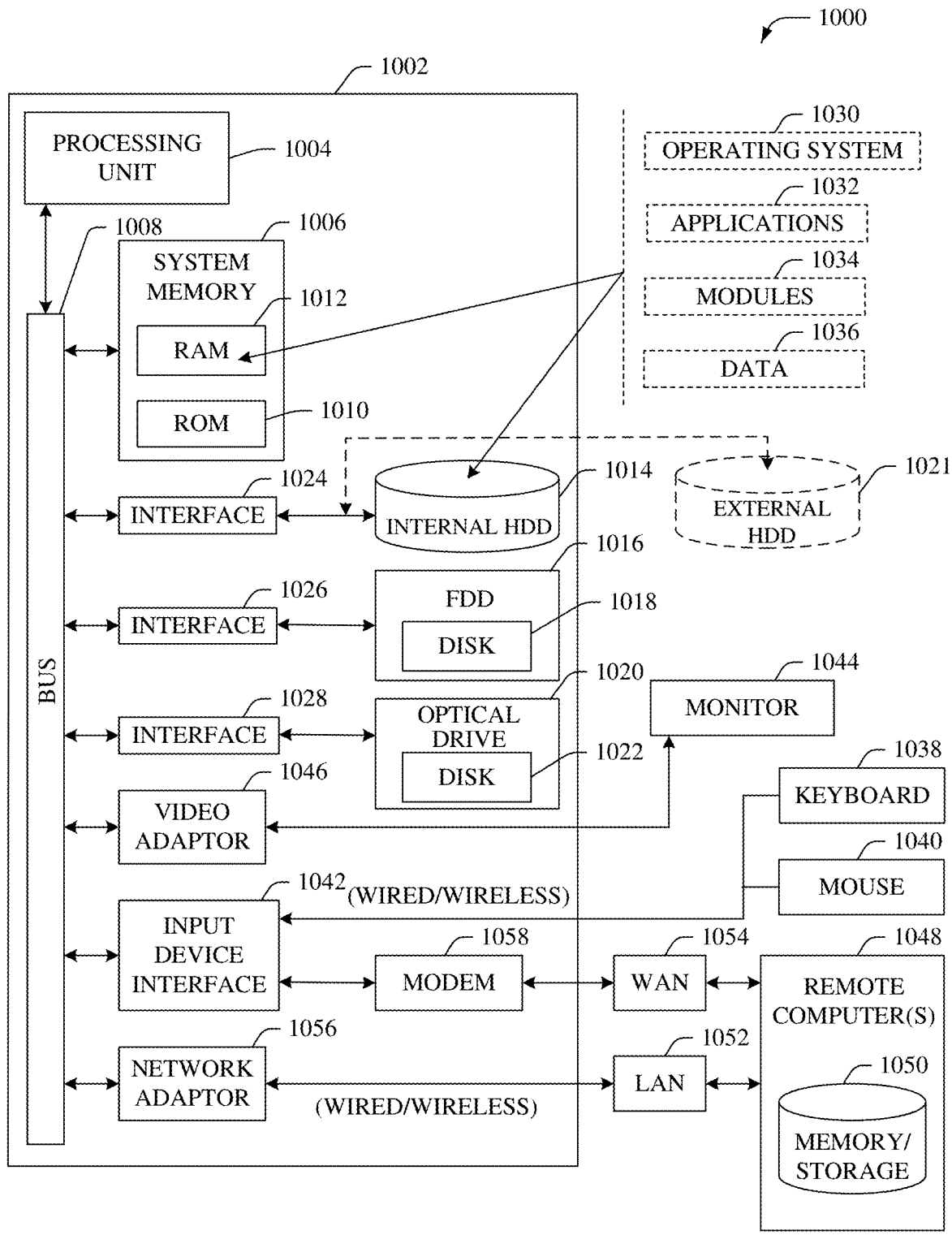
FIG. 10 illustrates a block diagram of a computer that can be employed in accordance with one or more embodiments.

FIG. 10 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, SDN controller 102, terrestrial controller 104 or satellite controller 106 (or any components of SDN controller 102, terrestrial controller 104 or satellite controller 106).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1010 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including, but not limited to, determining, according to a defined criterion, which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    obtaining, by a device comprising a processor, first information indicative of a condition of a terrestrial radio network and second information indicative of a resource of a satellite network, wherein the obtaining is based on a determination that a defined application is alternatively executable as being executable at a user equipment via the terrestrial radio network and as being executable at the user equipment via the satellite network;
    classifying, by the device, the first information indicative of the condition of the terrestrial radio network and the second information indicative of the resource of the satellite network according to a criterion to generate a classification;
    based on the classification, determining that a reassignment of the defined application from being executed via the terrestrial radio network to being executed via the satellite network facilitates an increased network coverage and increased bandwidth requested for executing the defined application;
    checking the reassignment of the defined application to the satellite network against services policy associated with the defined application; and
    based on the determination and the checking, facilitating, by the device, the reassignment of the defined application from being executed via the terrestrial radio network to being executed via the satellite network.

2. The method of claim 1, further comprising:
    evaluating, by the device, the classification in view of historical feedback information related to past reassignments of applications between the terrestrial radio network and the satellite network and based on a service level agreement assigned to the user equipment.

3. The method of claim 2, wherein the first information indicative of the condition of the terrestrial radio network comprises a network load condition of the terrestrial radio network, and wherein the evaluating comprises evaluating the network load condition relative to the resource of the satellite network, and the network load condition comprises an access load condition and a backhaul load condition of the terrestrial radio network.

4. The method of claim 2, wherein the evaluating comprises determining that the service level agreement assigned to the user equipment indicates one of the terrestrial radio network and the satellite network being high value resources and the other being low value resources.

5. The method of claim 2, wherein the evaluating comprises determining that the service level agreement assigned to the user equipment indicates that the user equipment is a premium subscribed user equipment having a higher quality of service associated therewith than a non-premium subscribed user equipment.

6. The method of claim 2, wherein the historical feedback information is based on artificial intelligence learning performed on historical results associated with the past reassignments of the applications between the terrestrial radio network and the satellite network.

7. The method of claim 1, wherein the first information indicative of the condition of the terrestrial radio network comprises a quality of experience received from an entity to whom the defined application is to be provided.

8. The method of claim 1, wherein the services policy associated with the defined application indicates whether to use or not the satellite network for the defined application.

9. The method of claim 1, wherein the satellite network is integrated with the terrestrial radio network to form an integrated network to which the user equipment connects.

10. A system, comprising:
    a processor; and
    a memory that stores executable instructions that, when executed by the processor, facilitate performance of operations, comprising:
    based on an application being alternatively executable at a user equipment via first network equipment and via second network equipment, classifying a defined condition of the first network equipment and a resource of the second network equipment, to a criterion to generate a classification;
    collecting information about the application from the first network equipment, the second network equipment and a policy server;
    based on the classification, and the information about the application, determining that a reassignment of the application from being executed via the first network equipment to being executed via the second network equipment facilitates an increased network coverage and increased bandwidth requested for executing the application; and
    based on a result of the determining and based on a service level agreement assigned to the user equipment, reassigning the application from being executed at the first network equipment to being executed at the second network equipment.

11. The system of claim 10, wherein the classifying further comprises comparing the defined condition and the resource to prior reassignments of applications, other than the application, wherein the prior reassignments of the applications comprise respective conditions of the first network equipment and respective resources of the second network equipment and the comparing comprises employing artificial intelligence to process of the prior reassignments of applications.

12. The system of claim 10, wherein the first network equipment is configured to operate according to at least a fifth generation communication protocol, and wherein the second network equipment is configured to operate according to at least a sixth generation communication protocol.

13. The system of claim 10, wherein the first network equipment is configured to operate according to at least a sixth generation communication protocol, and wherein the second network equipment is configured to operate according to at least a fifth generation communication protocol.

14. The system of claim 10 wherein the defined condition of the first network equipment comprises an access load condition of the first network equipment and a backhaul load condition of the first network equipment.

15. The system of claim 11, wherein the operations further comprise, based on the collected information about the application, determining that the application requires a real-time service, as opposed to a non-real-time network support, the application is latency-tolerant, the application being not compatible with the first network equipment or the second network equipment, or a combination thereof.

16. A non-transitory machine-readable medium, comprising executable instructions that, when executed by a processor, facilitate performance of operations, comprising:
- based on an application being executable at a user equipment either via first network equipment or via second network equipment, classifying first information indicative of a traffic load condition at the first network equipment and second information indicative of resources available at the second network equipment, to a criterion to generate a classification;
- collecting information about the application from the first network equipment, the second network equipment and a policy server;
- based on the classification, and the collected information about the application, determining that a reassignment of the application from being executed via the first network equipment to being executed via the second network equipment facilitates an increased network coverage and increased bandwidth requested for executing the application; and
- based on a result of the determining, changing an execution of the application from being executed via the first network equipment to being executed via the second network equipment.

17. The non-transitory machine-readable medium of claim 16, wherein the classifying is based on historical feedback information related to previous reassignments of applications between being executed via the first network equipment and being executed via the second network equipment and based on a service level agreement assigned to the user equipment.

18. The non-transitory machine-readable medium of claim 17, wherein the classifying comprises employing machine learning for inference related to the previous reassignments of the applications between being executed via the first network equipment and being executed via the second network equipment.

19. The non-transitory machine-readable medium of claim 16, wherein the first network equipment includes terrestrial radio network equipment configured to operate according to a new radio communication protocol and the second network equipment includes satellite network equipment configured to operate according to a sixth generation communication protocol.

20. The non-transitory machine-readable medium of claim 16, wherein the first network equipment, the second network equipment and the user equipment operate in an integrated network where a satellite network is integrated with a terrestrial radio networks.

* * * * *